6083X
2 Sheets—Sheet 1.
G. STOUDINGER.
Rolling Metal Bars.
Patented July 17, 1830.
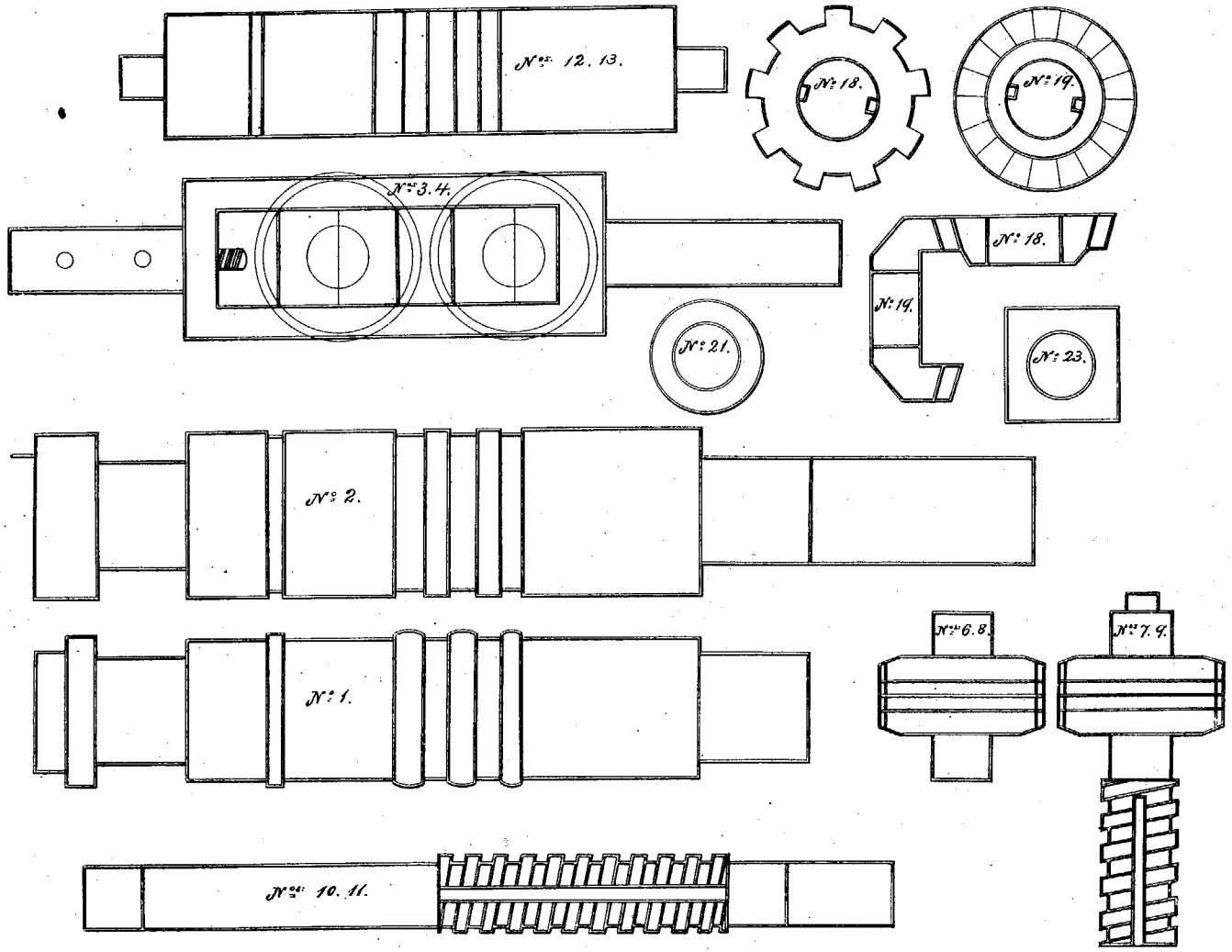
N. PETERS. Photo-Lithographer. Washington, D. C.

No Printed Specification Available
2 Sheets—Sheet 2.
6083X
G. STOUDINGER.
STEEL ROLLING MILL.
Patented July 17, 1830.
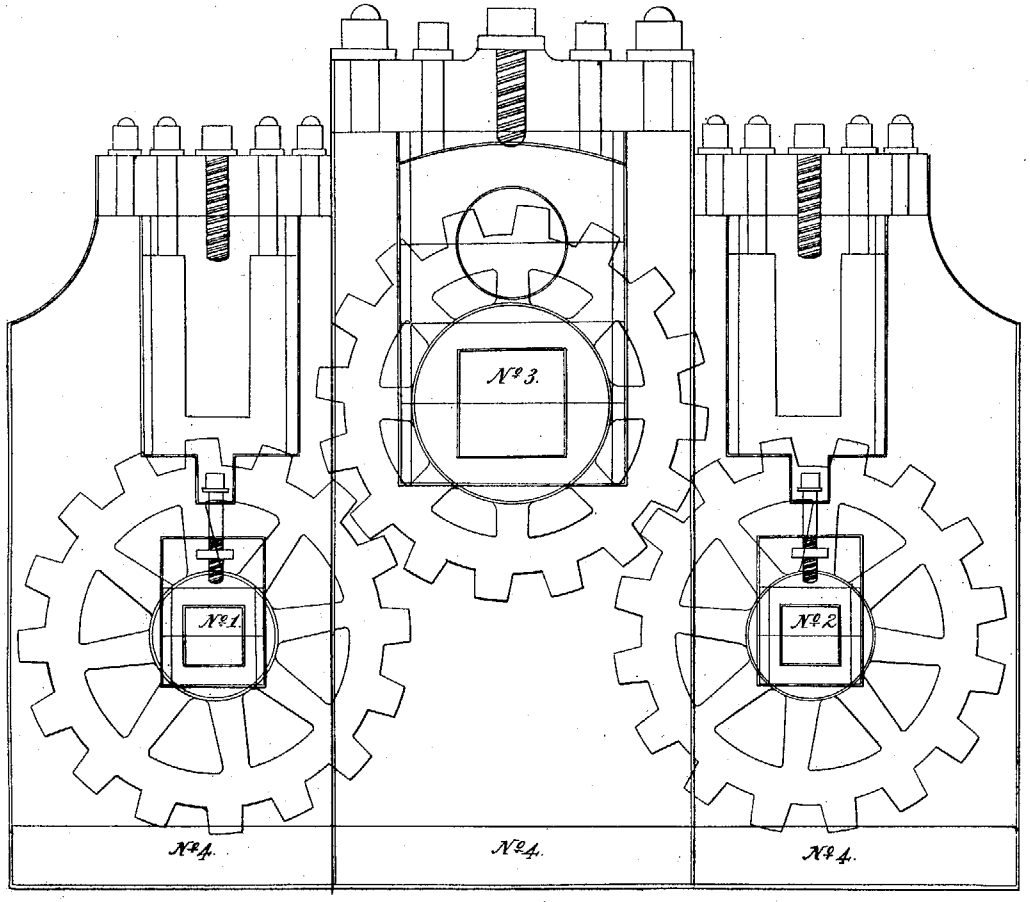
THE NORRIS PETERS CO., PHOTO-LITHO., WASHINGTON, D. C.

July 17 1830 9

George Stoudinger Newark N. J.

Letters Patent. X6083

The schedule referred to in these Letters Patent and making part of the same, containing a description in the words of the said George Stondinger himself, of his improvement in the steel rolling mill, for middling and edging spring steel for carriage springs.

To all to whom these presents shall come Be it known that I, George Stoudinger of Newark in the County of Essex and State of New Jersey, have invented a new and useful improvement in the steel rolling mill for middling and edging spring steel for carriage springs, and that the following is a full and exact description of the construction and operation of the said Machine, as invented or improved by me.

No. 1, is a top horizontal roller with rounding projections to middle out the steel, and said. ~~and said~~ roller to raise and lower with four screws through the caps. with one cog wheel on the end of it.

No. 2. is a bottom horizontal roller with square grooves in, on the square end of this roller are two cog wheels; said rollers are to roll steel from one inch up to three and wider if required. Nos 3 & 4, are frames in which the moveable perpendicular edging rollers are fastened; they move sideways so as to come opposite the grooves in the horizontal rollers Nos. 1 & 2, and raise & lower so that the grooves in the edging roller come opposite those in the horizontal rollers by screws through the caps; said frames are made in two pieces with sliding brass boxes, with screws in the ends of the frames. No. 5 in frames belong two extra boxes to

X6083

[illegible] [illegible] the edging rollers in Nos 3 & [illegible]
Nos 6 & 7 are perpendicular edging rollers with three cog
wheels on to one roller is fixed a moveable cog wheel on
with two tightening [illegible] in each of these rollers are three
grooves to edge the steel from No 1 up to No [illegible] wire
gague. Nos 8 & 9 are the same as Nos 6 & 7. No 10 is a
horizontal shaft with a cog wheel on the outside of the
frame and in the inside of the frame is a moveable
cog wheel with two tightning nuts, which drives the
perpendicular rollers. No 11 is the same as No 10.
Nos 12 & 13 are guides for the plates to pass through.

All of said machine is made of cast iron except
boxes which are of brass.

The manner of using the foregoing improved
machine is by placing the steel in the edging rollers
and then passing it through the midling rollers and
then through another pair of edging rollers.

The rollers are all driven by cog wheels, and when
the plates come out after passing through they are in
a finished state, both edged and middled out.

Accompanying this specification is a drawing
of which you have the model on a scale of one quarter
to the inch.

Newark N. Jersey July 10. 1830.

Witnesses — George Staudinger

Wm Pennington. Stephen Dow.

520